United States Patent [19]

Takahashi

[11] Patent Number: 4,777,511

[45] Date of Patent: Oct. 11, 1988

[54] AUTOMATIC DOCUMENT FEEDING DEVICE FOR AN ELECTROPHOTOGRAPHIC COPYING APPARATUS

[75] Inventor: Masanobu Takahashi, Suita, Japan

[73] Assignee: Mita Industrial Co., Ltd., Osaka, Japan

[21] Appl. No.: 122,096

[22] Filed: Nov. 17, 1987

[30] Foreign Application Priority Data

Nov. 18, 1986 [JP] Japan .................. 61-274902

[51] Int. Cl.⁴ ............................ G03G 15/00
[52] U.S. Cl. ................ 355/14 SH; 355/14 R; 355/23; 271/3.1; 271/226
[58] Field of Search .......... 355/14 SH, 14 R, 3 SH, 355/3 R, 8, 23, 24, 26; 271/3.1, 109, 34, 226, 227

[56] References Cited

U.S. PATENT DOCUMENTS

| | | | |
|---|---|---|---|
| 4,365,889 | 12/1982 | Silverberg | 355/14 SH |
| 4,368,973 | 1/1983 | Silverberg | 355/3 SH |
| 4,674,866 | 6/1987 | Tanaka | 355/23 |
| 4,705,389 | 11/1987 | Maekawa et al. | 355/26 |
| 4,707,117 | 11/1987 | Takenaka et al. | 355/14 SH X |
| 4,716,440 | 12/1987 | Couwenberg et al. | 355/14 SH |
| 4,727,398 | 2/1988 | Honjo et al. | 355/14 SH X |
| 4,727,401 | 2/1988 | Partilla et al. | 355/14 SH |
| 4,727,402 | 2/1988 | Smith | 355/14 SH |

Primary Examiner—A. C. Prescott
Attorney, Agent, or Firm—Beveridge, DeGrandi & Weilacher

[57] ABSTRACT

An automatic document feeding device additionally provided with a function of feeding the original to the transparent platen at a first feed position thereof when the original is fed from the original feeding section to the original delivering section, and feeding the original to the transparent platen at a second feed position thereof adjacent to the first feed position above-mentioned, when the original is fed from the original reversing section to the original delivering section, thereby an electrophotographic copying apparatus can be additionally provided easily with a function of respectively copying the obverse and reverse sides of the original on the same copying paper at its right- and left-half portions so that the copied paper will be a double truck.

6 Claims, 3 Drawing Sheets

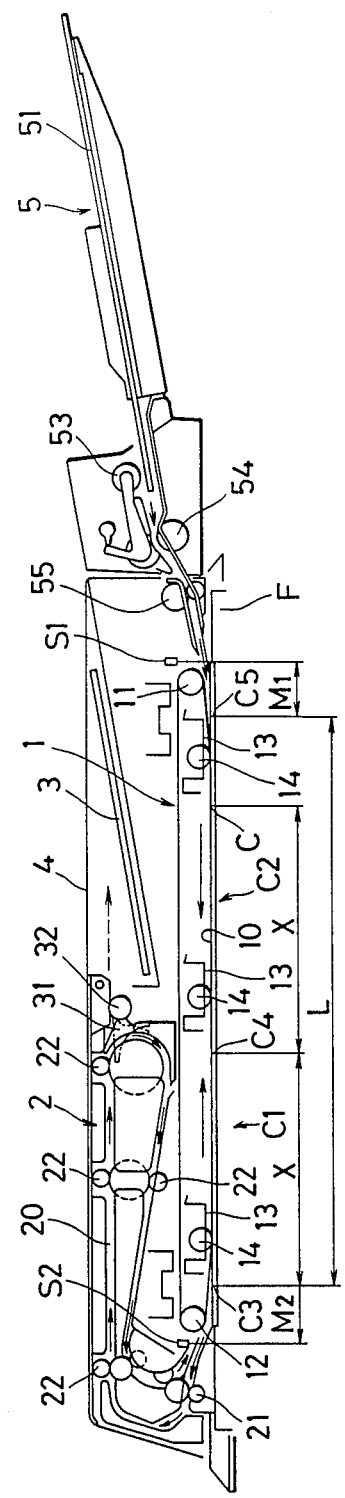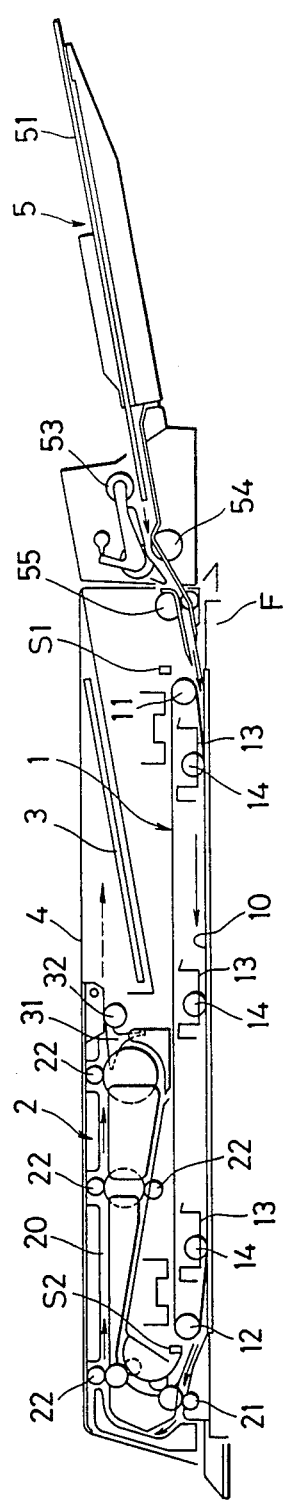

AUTOMATIC DOCUMENT FEEDING DEVICE FOR AN ELECTROPHOTOGRAPHIC COPYING APPARATUS

BACKGROUND OF THE INVENTION

The present invention relates to an automatic document feeding device for an electrophotographic copying apparatus. More particularly, the present invention relates to a reversing-type automatic document feeding device (RADF) capable of feeding an original document to a predetermined position of a transparent platen of the copying apparatus, guiding the original thus fed to an original reversing section to reverse the original, and feeding the original again to the transparent platen.

Recently, a demand for a multi-functional electrophotographic copying apparatus has become strong. As a part of such a demand, there has been proposed a copying apparatus provided with a function of forming copied images on both sides of a piece of copying paper, or a function of carrying out a plurality of copying operations on at least one side of copying paper (See, for example, Unexamined Japanese Patent Publication 77454/1984).

Such a copying apparatus is provided with a basic function of discharging, after a normal copying operation has been carried out, copying paper on which the image of an original has been fixed, as it is, to a receiving tray. In order to carry out a plurality of copying operations on the same copying paper, the copying apparatus is further provided with a function of guiding copying paper on which the image of an original has been fixed, again to a copying section along a curved guide which is formed inside of the copying apparatus body.

On the other hand, an electrophotographic copying apparatus having a function of forming original images on both sides of a piece of copying paper, is generally provided with an RADF which is not only capable of automatically feeding a both-sided (duplex) original from an original feeding section to a transparent platen, but also capable of reversing the original such that the original of which one side has been scanned and exposed, is copied at the other side thereof (See, for example, Unexamined Japanese Patent Publication 163959/1983).

In such an RADF, a loop-like original reversing section for reversing the original, is disposed in a continuous manner from an original delivering section of the belt delivery type opposite to the transparent platen. According to this RADF, a both-sided original fed from the original feeding section is fed to the transparent platen at a predetermined position thereof by the original delivering section. Upon completion of the scanning and exposure of one side of the original thus fed, the original is fed to the original reversing section by the original delivering section. After reversed, the original can be fed again onto the transparent platen.

In view of the demand for a multi-functional copying apparatus mentioned earlier, the inventors have tried to add a function of respectively copying the obverse and reverse sides of a both-sided original on the same copying paper at its left- and right-half portions so that the the copied paper will be a double truck, to a copying apparatus provided with a function of carrying out a plurality of copying operations on at least one side of copying paper.

In the RADF mentioned earlier, when feeding an original to the transparent platen from the original feeding section, and later from the original reversing section, the original is fed to the transparent platen at the same position thereof. Accordingly, even though this RADF is mounted on the copying apparatus above-mentioned, the copying apparatus as it is cannot copy, respectively, the obverse and reverse sides of a both-sided original on the same copying paper at its rightand left-half portions so that the copied paper will be a double truck.

More specifically, even though copying paper twice the size of a both-sided original is fed to a copying section having a photoreceptor drum and the like, and two copying operations are respectively tried to be carried out on the right- and left-half portions of this copying paper, the original before and after reversing is fed to the transparent platen at the same position thereof. This results in double copyings of images on the obverse and reverse sides of the original, on the same half-portion of the copying paper. It is therefore not possible to add the function above-mentioned to such a copying apparatus. Accordingly, the RADF of the type above-mentioned cannot easily comply with a demand for a multi-functional copying apparatus.

It is an object of the present invention to provide an RADF capable of respectively copying the obverse and reverse sides of a both-sided original on the same copying paper at its right- and left-half portions so that the copied paper will be a double truck, which can be additionally mounted on an electrophotographic copying apparatus provided with a function of carrying out a plurality of copying operations on at least one side of copying paper.

The RADF in accordance with the present invention comprises:

an original reversing section for introducing an original on a transparent platen to reverse the same;

an original delivering section for delivering the original as fed from an original feeding section and as reversed by the original reversing section while the original is held by and between the transparent platen and the original delivering section;

first original detector means for detecting that the original has been fed from the original feeding section to the original delivering section;

second original detector means for detecting that the original reversed by the original reversing section, has been fed to the original delivering section; and drive control means for controlling the drive of the original delivering section such that, in response to an original detection signal supplied from the first original detector means, the original is fed to the transparent platen at a first feed position thereof, and such that, in response to an original detection signal supplied from the second original detector means, the original is fed to the transparent platen at a second feed position thereof adjacent to the first feed position above-mentioned.

In accordance with the RADF arranged as above-mentioned, the first original detector means detects that the original has been fed from the original feeding section to the original delivering section, and in response to an original detection signal supplied from the first original detector means, the drive control means drives the original delivering section to feed the original to the transparent platen at the first feed position thereof. The second original detector means detects that the original reversed by the original reversing section has been fed to the original delivering section, and in response to an original detection signal from the second original detector means, the drive control means drives the original delivering section to feed the reversed original to the transparent platen at the second feed position thereof adjacent to the first feed position.

The object of the present invention above-mentioned will be more apparent from the following detailed description with reference to the attached drawings.

DETAILED DESCRIPTION OF THE PREFERRED EMBODIMENTS

Figures 1, 3:
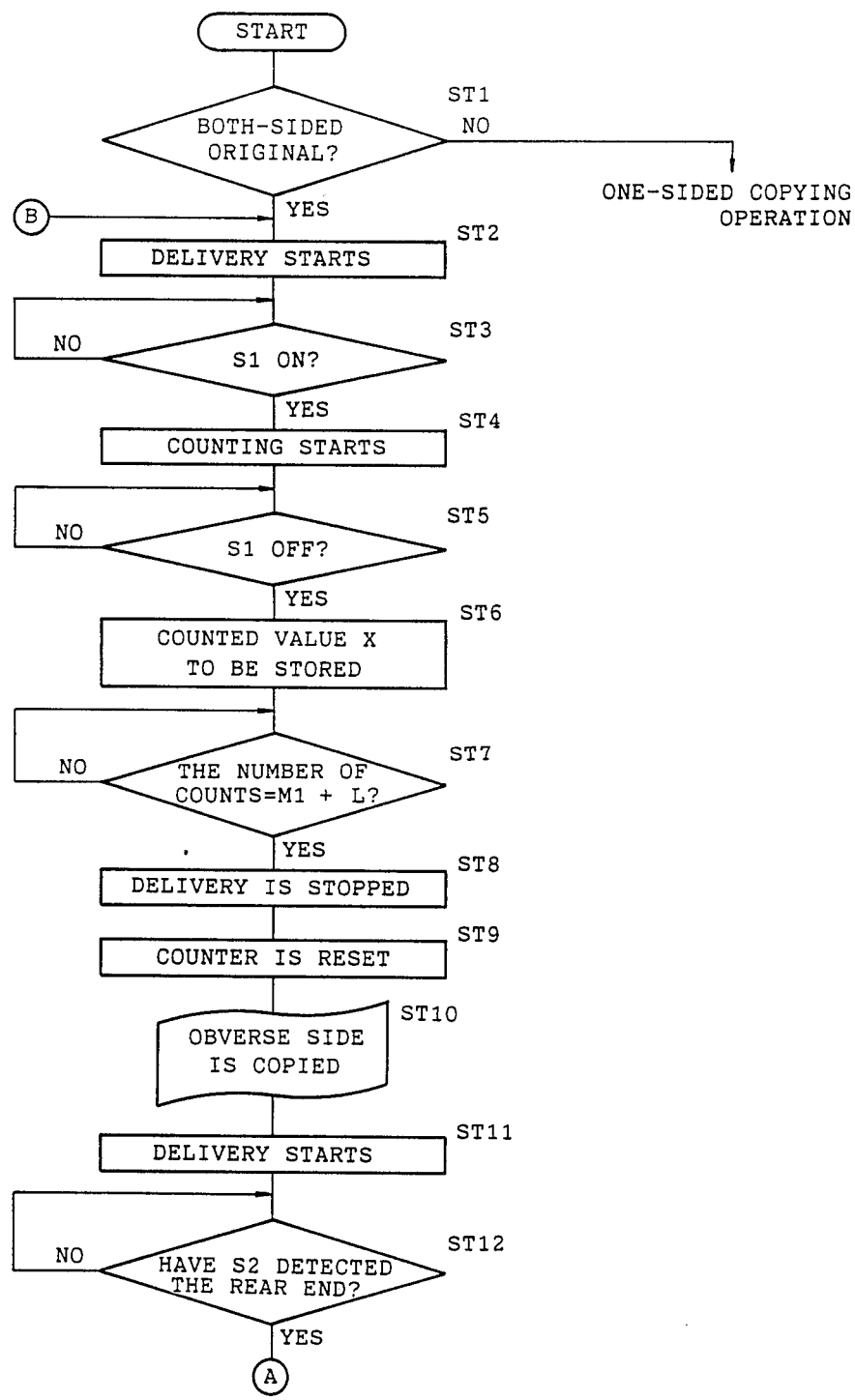
FIG. 1 is a schematic view illustrating the inner arrangement of the RADF in accordance with the present invention, and a flow of an original in a both-sided copying mode.
FIG. 3 is a flowchart.

The following description will discuss in more detail the present invention with reference to the attached drawings showing a preferred embodiment of the present invention.

The description will first be made for the arrangement of the RADF in accordance with the present invention.

The RADF is provided with an original delivering section 1 for delivering an original to a transparent platen C at a predetermined position thereof, and an original reversing section 2 for introducing the original (both-sided original) of which reverse side is to be copied in a continuous manner after the obverse side has been copied, from the transparent platen C, both sections 1 and 2 being disposed inside of a casing 4 mounted on the top of an electrophotographic copying apparatus F. The casing 4 also incorporates at its upper portion an original collecting section 3 to which the original already scanned and exposed is discharged. Disposed at the right end of the original delivering section 1 is an original feeding section 5 for automatically feeding the original to the original delivering section 1.

More specifically, the original delivering section 1 is provided with a delivery belt 10 rotatable in both forward and reverse directions. Both ends of this belt 10 are wound on rollers 11 and 12 separated from each other by a predetermined distance. The lower side of the belt 10 comes in contact with the transparent platen C by pressure rollers 14 downwardly biased by springs 13. The original can be delivered as held by and between the delivery belt 10 and the transparent platen C.

The original feeding section 5 is adapted to feed the original to a gap between one end of the delivery belt 10 and the transparent platen C. In FIG. 1, the original feeding section 5 is disposed at the right-end portion of the original delivering section 1. The section 5 mainly comprises an original tray 51 for stacking originals thereon, a feeding roller 53 for feeding the originals stacked on the original tray 51 one by one, a pair of delivery rollers 54 for delivering an original fed by the feeding roller 53 toward the delivery belt 10, and a pair of registration rollers 55 for temporarily keeping the original delivered by the delivery rollers 54 waiting and for correcting the delivery direction of the original delivered inclinedly with respect to a predetermined delivery direction, to the predetermined delivery direction.

In FIG. 1, the original reversing section 2 is disposed at the side of the left-end portion of the original delivering section 1. This original reversing section 2 incorporates a loop-like delivery passage 20 for reversing a both-sided original fed from a gap between the delivery belt 10 and the transparent platen C, and for guiding this original again to the gap between the delivery belt 10 and the transparent platen C. Disposed along the delivery passage 20 are a guide roller 21 for introducing the original sent from the gap between the delivery belt 10 and the transparent platen C, into the delivery passage 20, and delivery rollers 22 for successively delivering the original thus introduced.

The original collecting section 3 is branched from a mid-portion of the delivery passage 20 of the original reversing section 2. The original collecting section 3 is provided at the branch portion with a rotary claw 31 for switching the delivery passage of the original delivered along the delivery passage 20, toward the original collecting section 3. The original collecting section 3 is also provided with a discharge roller 32 for delivering the original fed from the branch portion, to the original collecting section 3 at a predetermined position thereof.

The RADF having the arrangement above-mentioned is provided with first original detector means S1 for detecting that the original has been fed from the original feeding section 5, and second original detector means S2 for detecting that the original reversed by the original reversing section 2 has been sent therefrom, these detector means S1 and S2 being respectively disposed adjacent to both ends of the delivery belt 10. These first and second original detector means S1 and S2 may be made up from, for example, optical sensors, micro-switches or the like.

A drive control section (not shown) of the RADF is provided with drive control means of the conventional type for reversing the original fed from the original feeding section 5 to a first feed position C1 on the transparent platen C and for feeding the original again to the first feed position C1. This drive control section is further provided with drive control means for controlling the drive of the delivery belt 10 such that, in response to an original detection signal from the first original detector means S1, the original is fed to the first feed position C1 on the transparent platen C and such that, in response to an original detection signal from the second original detector means S2, the original is fed to the transparent platen C at its second feed position C2 adjacent to the first feed position C1.

More specifically, the first feed position C1 is set such that the tip of the original fed from the original feeding section 5 is brought to a first reference position C3 set adjacent to the left end of the transparent platen C. The second feed position C2 is set such that the rear end of the original sent from the original reversing section 2 is brought to a second reference position C4 which is separated from the first reference position C3 by a distance X corresponding to the size of the original in its travelling direction. It is a matter of course that the second reference position C4 varies with the size of the original to be copied.

A position designated by C5 in FIG. 1 is separated from the first reference position C3 by a distance L corresponding to the length of a maximum copiable original (for example, the size of the longer side of JIS A3-type paper). Now, the distance between the position C5 and the first original detector means S1 is designated by M1, and the distance between the first reference position C3 and the second original detector means S2 is designated by M2. The second drive control means controls the drive of the original delivering section 1 such that, after detected by the first original detector means S1, the original is delivered by a distance equal to M1+L, and such that, after the second original detector means S2 has detected the rear end of the original, the original is delivered by a distance equal to M2+X. Such drive control can be achieved by, for example, counting pulses to estimate the moved amount of the delivery belt 10.

The RADF having the arrangement above-mentioned can be mounted on an electrophotographic copying apparatus provided with a function of carrying out a plurality of copying operations on at least one side of copying paper. When carrying out an equal-magnification copying operation in such an apparatus with the RADF mounted, images on the obverse and reverse sides of an original can be copied on the same copying paper P at its right-and left-half portions so that the copied paper will be a double truck, by merely selecting copying paper twice the size of the original and by respectively carrying out two copying operations on the right- and left-half portions of the same copying paper. (A mode in which images on the obverse and reverse sides of the original are copied on the same copying paper at its left- and right-half portions so that the copied paper will be a double truck, is hereinafter referred to as a double truck mode.)

More specifically, at the first copying operation with the copying apparatus above-mentioned, an image on one side of a both-sided original fed to the first feed position C1 can be copied on copying paper at, for example, its left-half portion. At the second copying operation, an image on the other side of the both-sided original fed to the second feed position C2 can be then copied on the same copying paper at its right-half portion.

More specifically, at the first copying operation, the original has not been fed to the second feed position C2. Accordingly, no copied image is formed on the copying paper at, for example, its right-half portion corresponding to the second feed position C2. At the second copying operation, the original has not been fed to the first feed position C1. This results in the same effect as that which would be obtained if a blank original is copied on the copying paper at its left-half portion corresponding to this first feed position C1. Thus, one composite copy can be obtained without exerting a bad influence upon the copy image previously formed on the copying paper.

When the copying apparatus above-mentioned is additionally provided with a both-sided copying function, images on the obverse and reverse sides of another bothsided original can be copied on the reverse side of the copying paper P at its right- and left-half portions so that the copied paper will be a double truck.

FIG. 3 is a flowchart showing in detail the control steps of the second drive control means.

Figures 2, 3:
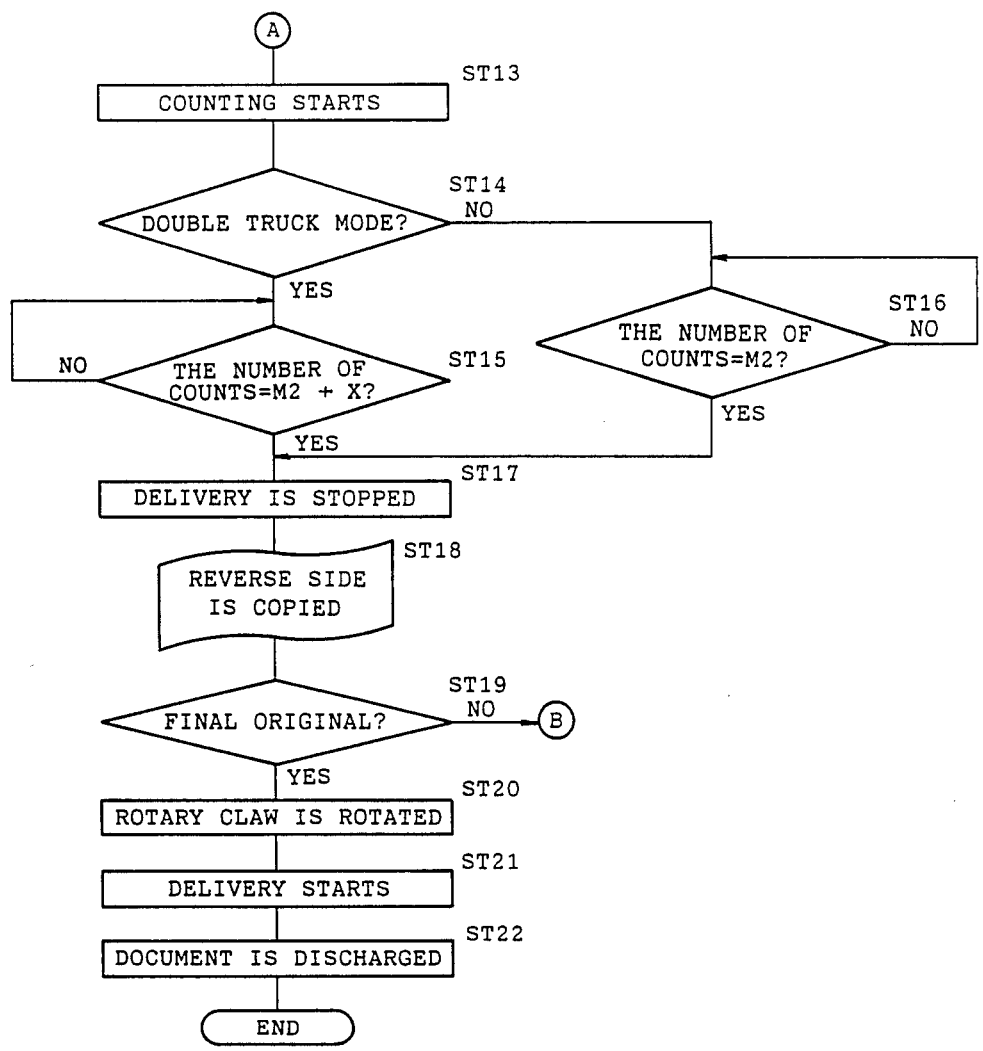
FIG. 2 is a schematic view illustrating a flow of an original in a one-sided (simplex) copying mode.

At the step ST1, it is judged whether or not the original placed on the original tray 51 of the original feeding section 5 is a both-sided original. Such judgement may be achieved by a key-entry operation to be made by the operator, or by optically reading the original placed on the original tray 51. When it is judged at the step ST1 that the original is not a both-sided original, there is carried out a normal operation of copying only one side of the original. That is, the original is delivered to the first feed position C1 by the delivery belt 10, and a copying operation is carried out. Thereafter, the delivery belt 10 is again driven to guide the original to the original reversing section 2. The original is then discharged to the original collecting section 3 (See FIG. 2).

When it is judged at the step ST1 that the original is a both-sided original, the operations as shown in FIG. 1 are carried out.

More specifically, at the step ST2 the delivery of the original is started, and it is judged at the step ST3 whether or not the first original detector means S1 has been turned ON, i.e., whether or not the tip of the original has been detected. When it is judged that the S1 has been turned ON, pulses are counted at the step ST4. At the step ST5, it is judged whether or not the first original detector means S1 has been turned OFF, i.e., whether or not the rear end of the original has been detected. When it is judged that the S1 has been turned OFF, the counted value X is stored. Thus, the size of the original in its travelling direction is automatically read. The counting operation is further continued. When the number of counts corresponding to the moving amount of the delivery belt 10 has reached M1+L at the step ST7, the delivery belt 10 is stopped at the step ST8. At the step ST9, the counting is reset. Thus, the tip of the original fed from the original feeding section 5 is brought to the first reference position C3 set adjacent to the left-end of the transparent platen C. At the step ST10, the obverse side of the original is copied. Upon completion of such copying, at the step ST11 the delivery belt 10 is driven to guide the original to the original reversing section 2, where the original is reversed. When the original is guided to the original reversing section 2, the delivery belt 10 is reversely driven. When the transit of the rear end of the original is detected by the second original detector means S2 at the step ST12, the time counting is restarted at the step ST13. At the step ST14, it is judged whether or not the copying mode is the double truck mode. When the mode is the double truck mode, the sequence proceeds to the step ST15. At the step ST15, it is judged whether or not the number of counts is equal to M2+X. The delivery is stopped when the number of counts becomes equal to M2+X (the step ST17). Thus, after the second original detector means S2 has detected the rear end of the original, the original can be delivered by a distance equal to M2+X and then stopped at the second feed position C2.

When the mode is not the double truck mode, the sequence proceeds to the step ST16. At the step ST16, it is judged whether or not the number of counts is equal to M2. When the number of counts becomes equal to M2, the delivery is stopped (Step ST17). In this case, after detected by the second original detector means S2, the original can be delivered by a distance equal to M2 and then stopped. Accordingly, the original is stopped at the first feed position C1. Thus, a normal both-sided copying operation can be carried out.

At the step ST18, the reverse side of the original is copied. At the step ST19, it is judged whether or not the number of copies has reached a predetermined number, i.e., whether or not copying the final original is completed. When it is judged that copying the final original is not completed, the sequence is returned to the step ST2 and the subsequent steps will be repeated. When it is judged that copying the final original is completed, the rotary claw 31 is rotated in a paper discharging direction at the step ST20. At the step ST21, the delivery is started to guide the original to the original collecting section 3.

It is noted that the RADF in accordance with the present invention is not limited to the embodiment hereinbefore described and illustrated.

For example, the first feed position C1 shown in FIG. 1 may be set to a position corresponding to the second feed position C2 in FIG. 1, while the second feed position C2 may be set to a position corresponding to the first feed position C1 in FIG. 1. That is, the first feed position C1 and the second feed position C2 may be replaced with each other. In such an arrangement, the original fed from the original feeding section 5 is fed to the feed position at the side of the original feeding section 5 (which feed position corresponds to the second feed position C2 in FIG. 1). After scanned and exposed, the original is sent to the original reversing section 2 by the delivery belt 10. After reversed by the original reversing section 2, the original is fed to the feed position at the side of the original reversing section 2 (which feed position corresponds to the first feed position C1 in FIG. 1).

Further, it is possible to detect the size of the original in response to a signal from an operating portion of the copying apparatus (for example, a signal supplied by an original selection key). Further, delivery rollers may be used instead of the delivery belt in the original delivering section 1.

As discussed hereinbefore, according to the present invention an electrophotographic copying apparatus can be additionally provided easily with a function of respectively copying both sides of a both-sided original on the same copying paper at its right- and left-half portions so that the copied paper will be a double truck. Thus, the present invention provides a peculiar advantage to readily comply with a demand for a multi-functional copying apparatus.

What is claimed is:

1. Automatic document feeding device for an electrophotographic copying apparatus comprising:

an original reversing section for introducing an original on a transparent platen to reverse the same;

an original delivering section for delivering the original as fed from an original feeding section and the original as reversed by said original reversing section while holding the original by and between said transparent platen and said original delivering section;

first original detector means for detecting that the original has been fed from said original feeding section to said original delivering section;

second original detector means for detecting that the original reversed by said original reversing section, has been fed to said original delivering section;, and drive control means for controlling the drive of said original delivering section such that, in response to an original detection signal supplied from said first original detector means, the original is fed to said transparent platen at a first feed position thereof, and such that, in response to an original detection signal supplied from said second original detector means, the original is fed to said transparent platen at a second feed position thereof adjacent to said first feed position.

2. An automatic document feeding device for an electrophotographic copying apparatus according to claim 1, wherein the drive control means includes time measuring means for measuring a period of time during which the original is delivered to the first feed position, upon receipt of an original detection signal supplied from the first original detector means, and for measuring a period of time during which the original is delivered to the second feed position, upon receipt of an original detection signal supplied from the second original detector means, and the drive of the original delivering section can be controlled according to the time thus measured.

3. Automatic document feeding device for electrophotographic copying apparatus according to claim 1, wherein the drive control means calculates the second feed position in response to a period of time during which an original detection signal is received from the first original detector means.

4. Automatic document feeding device for electrophotographic copying apparatus according to claim 1, wherein the drive control means calculates the second feed position in response to a signal from an original selection key of the main body of said copying apparatus.

5. Automatic document feeding device for electrophotographic copying apparatus according to claim 1, wherein the first and second original detector means are optical sensors.

6. Automatic document feeding device for electrophotographic copying apparatus according to claim 1, wherein the original delivering section is a delivery belt.

* * * * *